(12) United States Patent
Wang et al.

(10) Patent No.: US 12,242,809 B2
(45) Date of Patent: Mar. 4, 2025

(54) TECHNIQUES FOR PRETRAINING DOCUMENT LANGUAGE MODELS FOR EXAMPLE-BASED DOCUMENT CLASSIFICATION

(71) Applicant: Microsoft Technology Licensing, LLC, Redmond, WA (US)

(72) Inventors: Guoxin Wang, Bellevue, WA (US); Dinei Afonso Ferreira Florencio, Redmond, WA (US); Wenfeng Cheng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 17/836,977

(22) Filed: Jun. 9, 2022

(65) Prior Publication Data

US 2023/0401386 A1 Dec. 14, 2023

(51) Int. Cl.
*G06F 40/30* (2020.01)
*G06F 16/906* (2019.01)
(Continued)

(52) U.S. Cl.
CPC ............ *G06F 40/30* (2020.01); *G06F 16/906* (2019.01); *G06F 16/93* (2019.01); *G06F 40/284* (2020.01); *G06F 40/289* (2020.01); *G06N 5/022* (2013.01)

(58) Field of Classification Search
CPC ........ G06F 40/30; G06F 40/10; G06F 40/117; G06F 40/12; G06F 40/131; G06F 40/137;
(Continued)

(56) References Cited

U.S. PATENT DOCUMENTS 11,074,412 B1 7/2021 Leeman-munk et al.
2020/0279105 A1 9/2020 Muffat et al.
(Continued)

FOREIGN PATENT DOCUMENTS

| CN | 110442684 B | 6/2020 |
| JP | 4994199 B2 | 5/2012 |
| JP | 5346841 B2 | 8/2013 |

OTHER PUBLICATIONS

Pramanik et al., "Towards a Multi-modal, Multi-task Learning based Pre-training Framework for Document Representation Learning", public paper, Jan. 5, 2022.*

(Continued)

*Primary Examiner* — Qi Han
(74) *Attorney, Agent, or Firm* — NovoTechIP International PLLC

(57) ABSTRACT

A data processing system implements a method for training machine learning modes, including receiving a set of one or more unlabeled documents associated one or more first categories of documents to be used to train machine learning models to analyze the one or more unlabeled documents, and fine-tuning a first machine learning model and a second machine learning model based on the one or more unlabeled document to enable the first machine learning model to determine a semantic representation of the one or more first categories of document, and to enable the second machine learning model to classify the semantic representations according to the one or more first categories of documents, the first machine learning model and the second machine learning model having been trained using first unlabeled training data including a second plurality of categories of documents that do not include the one or more first categories of documents.

19 Claims, 9 Drawing Sheets

(51) Int. Cl.
   *G06F 16/93* (2019.01)
   *G06F 40/284* (2020.01)
   *G06F 40/289* (2020.01)
   *G06N 5/022* (2023.01)

(58) Field of Classification Search
   CPC ...... G06F 40/151; G06F 40/16; G06F 40/194; G06F 40/20; G06F 40/205; G06F 40/216; G06F 40/279; G06F 40/35; G06F 40/40; G06F 40/44; G06F 40/45; G06F 40/56
   USPC .................................. 704/9, 1, 2, 4, 7, 257
   See application file for complete search history.

(56) References Cited

U.S. PATENT DOCUMENTS

| 2021/0142181 A1* | 5/2021 | Liu ........................ G06N 3/045 |
| 2021/0286989 A1* | 9/2021 | Zhong ................... G06F 40/177 |
| 2022/0092101 A1 | 3/2022 | Yun et al. |

OTHER PUBLICATIONS

Bahdanau, et al., "Neural Machine Translation by Jointly Learning to Align and Translate", In Proceedings of 3rd International Conference on Learning Representations, May 7, 2015, 15 Pages.

Ferrando, et al., "Improving Accuracy and Speeding up Document Image Classification Through Parallel Systems", In Proceedings of 20th International Conference on Computational Science, Jun. 3, 2020, pp. 387-400.

Khandve, et al., "Hierarchical Neural Network Approaches for Long Document Classification", In Repository of arXiv:2201.06774v1, Jan. 18, 2022, pp. 1-11.

Xu, et al., "LayoutLM: Pre-training of Text and Layout for Document Image Understanding", In Proceedings of the 26th ACM SIGKDD International Conference on Knowledge Discovery & Data Mining, Aug. 23, 2020, pp. 1192-1200.

Xu, et al., "LayoutLMv2: Multi-Modal Pre-training for Visually-Rich Document Understanding", In Proceedings of the 59th Annual Meeting of the Association for Computational Linguistics and the 11th International Joint Conference on Natural Language Processing (vol. 1: Long Papers), Aug. 1, 2021, pp. 2579-2591.

* cited by examiner

TECHNIQUES FOR PRETRAINING DOCUMENT LANGUAGE MODELS FOR EXAMPLE-BASED DOCUMENT CLASSIFICATION

BACKGROUND

Document Intelligence is aspect of natural language processing (NLP) in which scanned documents or documents which originate in a digital form are analyzed using one or more NLP models to perform various tasks. One such task is document classification. Document classification predicts that a document belongs to one or more classes or categories of document. Understanding and analyzing documents especially business documents can greatly enhance business efficiency and productivity. Document classification has numerous applications in diverse commercial scenarios and domains, including but not limited to email classification systems, automated document image categorization, and document search engines.

Document classification can be particularly challenging because there may be a wide range of visual variability within each document type. Obtaining sufficient training data to train an NLP model to recognize a particular document type may be challenging. Furthermore, segmentation challenges also often arise. Multiple documents and/or types of documents are often received, and the NLP model needs to understand how to segment these documents prior to document classification. Hence, there is a need for improved systems and methods that provide a technical solution for improved document classification and segmentation.

SUMMARY

An example data processing system according to the disclosure may include a processor and a machine-readable medium storing executable instructions. The instructions when executed cause the processor to perform operations including receiving a set of one or more unlabeled documents associated one or more first categories of documents to be used to train machine learning models to analyze the one or more unlabeled documents; and fine-tuning a first machine learning model and a second machine learning model based on the one or more unlabeled document to enable the first machine learning model to determine a semantic representation of the one or more first categories of document, and to enable the second machine learning model to classify the semantic representations according to the one or more first categories of documents, the first machine learning model and the second machine learning model having been trained using first unlabeled training data including a second plurality of categories of documents, the second plurality of categories of documents not including the one or more first categories of documents.

An example method implemented in a data processing system for identifying one-way correctness issues in datasets of large computing systems includes receiving a set of one or more unlabeled documents associated one or more first categories of documents to be used to train machine learning models to analyze the one or more unlabeled documents; and fine-tuning a first machine learning model and a second machine learning model based on the one or more unlabeled document to enable the first machine learning model to determine a semantic representation of the one or more first categories of document, and to enable the second machine learning model to classify the semantic representations according to the one or more first categories of documents, the first machine learning model and the second machine learning model having been trained using first unlabeled training data including a second plurality of categories of documents, the second plurality of categories of documents not including the one or more first categories of documents.

An example machine-readable medium on which are stored instructions according to the disclosure includes instructions, which when executed, cause a processor of a programmable device to perform operations of receiving a set of one or more unlabeled documents associated one or more first categories of documents to be used to train machine learning models to analyze the one or more unlabeled documents; and fine-tuning a first machine learning model and a second machine learning model based on the one or more unlabeled document to enable the first machine learning model to determine a semantic representation of the one or more first categories of document, and to enable the second machine learning model to classify the semantic representations according to the one or more first categories of documents, the first machine learning model and the second machine learning model having been trained using first unlabeled training data including a second plurality of categories of documents, the second plurality of categories of documents not including the one or more first categories of documents.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
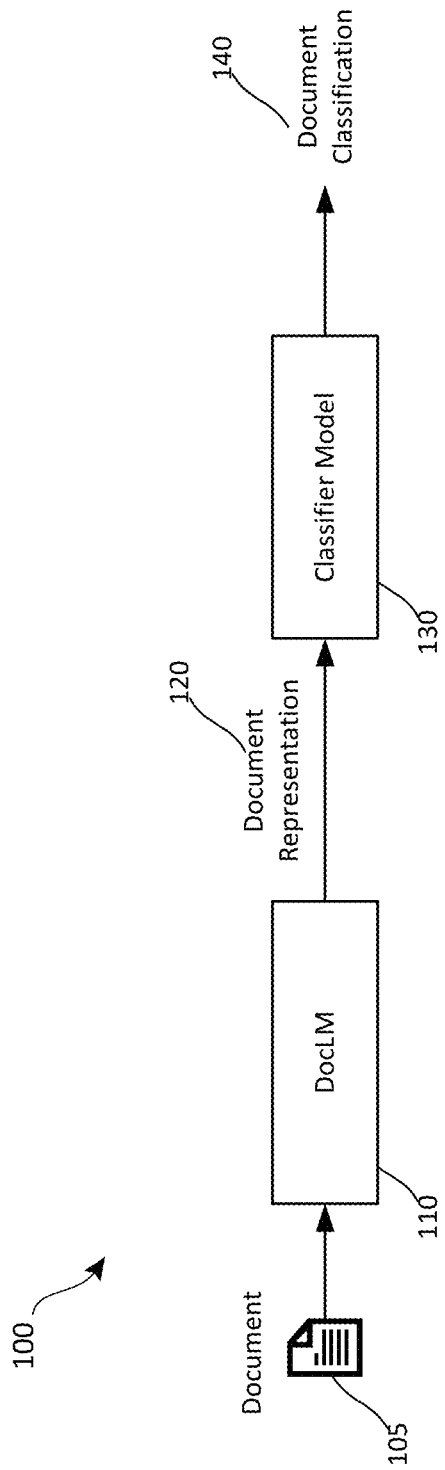
FIG. 1 is a diagram showing an example document classification pipeline in which the techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for pretraining document language models for example-based document classification are provided. These techniques provide a technical solution associated with document classification model where there is very limited data for training such an NLP model. The techniques herein implement a deep learning-based solution for customizable document classification from a small number of examples of the documents to be classified. One aspect of these techniques is the introduction of a heuristic method for generating document distance from document pairs as a training target. In one embodiment, these techniques utilize a document language model that includes transformer encoder layers and a self-attention based fusion component that facilitates encoding of complex documents into a singleton representation. The document language model is trained using a self-supervised pretraining and contrastive learning pretraining strategy. A technical benefit of this approach is that the components of the document language model are trained without explicit document similarity labels. Consequently, a customized document language model may be trained directly on a dataset comprising a small number of customer documents without having to label the examples included in the dataset. The pretrained language document model generates semantic representations of these examples, and these semantic representations are provided to a distance-based classifier to predict a nearest document category for each of the examples.

These techniques provide numerous technical benefits. One technical benefit is that the document language model achieves high accuracy even with few examples of each document category. Another technical benefit provided by these techniques is that the self-supervised strategy for pretraining document language model is very efficient. Supervised learning can cause a major bottleneck in the development of a machine learning model, because supervised learning requires a significant investment in the developing labeled data. Unsupervised learning does not rely on labeled data in order to train the model. The document language model is pretrained with unlabeled documents, thereby avoiding the time-consuming task of manually labeling training data and the significant expense of obtaining training data that has already been labeled. Consequently, unsupervised learning also enables the model to be trained using a much larger sets of training data, because the data does not need to be labeled. Furthermore, unsupervised learning technique are efficient and do not require significantly more computing and/or memory resources than would be required to support supervised learning.

Yet another technical benefit of these techniques is that complex, multipage document layouts are supported. The pretrained document language model may encode complex layout information. Complex documents may be divided and encoded in multiple chunks, and these chunks are fused into a singleton representation of the document. Another technical benefit of these techniques is that a customer does not need to perform extensive training to customize the pretrained document language model. A customer may provide a few examples of a document type to customize the model for their needs. Consequently, the models provide the flexibility of supporting a wide variety of document layouts from single page document to multipage documents without requiring that computing resources be dedicated to training and deploying multiple models to handle various types of documents.

Another technical benefit of these techniques is the flexibility to define additional document categories by training the document language model with a few examples of that category of document. The computing and/or memory resources required to fine-tune the pretrained models to be able to handle additional categories of documents are much less than would be required to train a completely new model. These and other technical benefits of the techniques disclosed herein will be evident from the discussion of the example implementations that follow.

Figure 5:
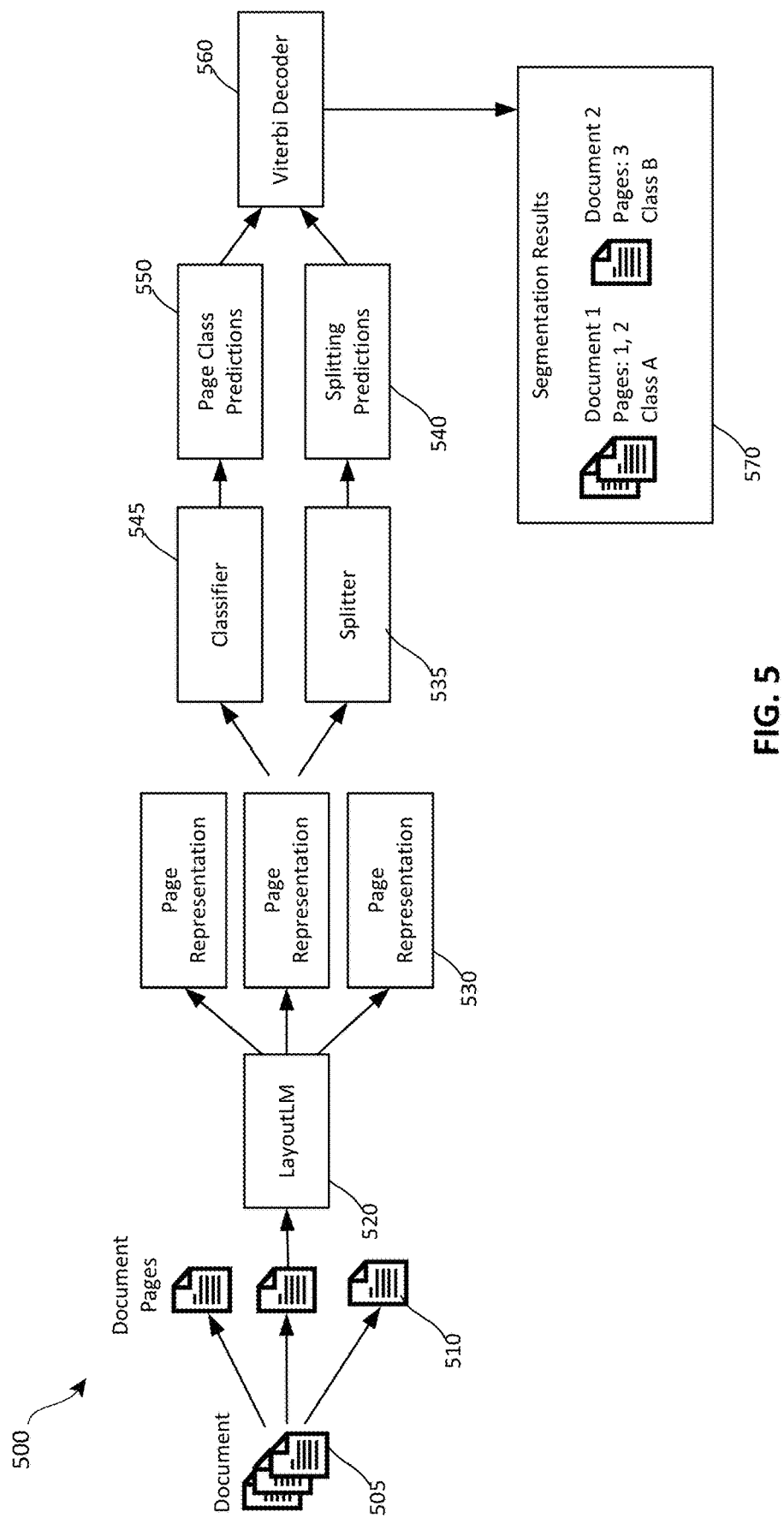
FIG. 5 is another implementation of the document classification pipeline shown in the preceding examples that includes segmentation functionality for processing inputs that include multiple files.

FIG. 1 is a diagram showing an example document classification pipeline 100 in which the techniques disclosed herein may be implemented. The document classification pipeline 100 may be implemented according to the techniques provided herein to classify documents, such as the document 105 shown. The document 105 is an electronic copy of a document. The document 105 may be a scanned copy of a physical document or may be an electronic document that originated in digital form. The example document classification pipeline 100 shown in FIG. 1 is configured to receive a single document as an input. However, FIG. 5 shows an example of another implementation of the document classification pipeline 500 that is configured to accept multiple documents as an input and to segment and classify the documents received. Additional details of the implementation shown in FIG. 5 are provided in the examples which follow.

Referring once again to FIG. 1, the document classification pipeline 100 includes a document language model 110 (also referred to herein as "DocLM") and a classifier model 130. The DocLM is configured to analyze the document 105 and to output a document representation 120 that is provided as an input to the classifier model 130. The classifier model 130 is configured to analyze the document representation 120 and to output a document classification 140.

The DocLM 110 is configured to analyze various types of documents and to extract structured data from the documents, which is output as the document representation 120. The document representation is a sematic representation of the document that was provided as input to DocLM 110. The DocLM 110 is based LayoutLM in some implementations. The DocLM 110 includes Transformer Encoding Layers for encoding chunks (portions of the textual content and layout information) of the document and a Self-Attention Fusion Module for combining the encodings associated with the document. Additional details of the Transformer Encoding Layers and the Self-Attention Fusion Module are shown in FIGS. 2 and 3, which are discussed in the detail in the examples which follow.

The classifier model 130 is configured to receive the document representation 120 output by the DocLM 110 and analyze the document representation 120 to predict a document classification for the document based on the semantic information included therein. In some embodiments, the classifier model 130 is a distance-based classifier that predicts the nearest document category for a document 105 based on the class or category of document that is closest in distance to the document representation 120. In other embodiments, the classifier model 130 is pretrained using samples of the document classes under consideration, which may or may not be the same as used in pretraining the model 110. The pretraining data include examples of documents of numerous document classes that may be commonly encountered by enterprises, such as but not limited to invoices, purchase orders, and the like. The pretraining data may include multiple examples of documents in each document class and may include examples of documents that may be encountered by a wide variety of enterprises. The classifier model 130 may then be further trained to recognize customer-specific document classes based on document examples provided by the customer. Because the DocLM 110 and the classifier model 130 are pretrained on a large dataset of training data, models may be trained to recognize customer-specific document classes with just a few examples of such documents. Thus, pretraining the models provides significant technical benefits, including significantly reducing the amount of example documents that the customer needs to provide to train the model, and reducing the amount of computing and memory resources required to train the model to recognize these additional document types.

Figure 2:
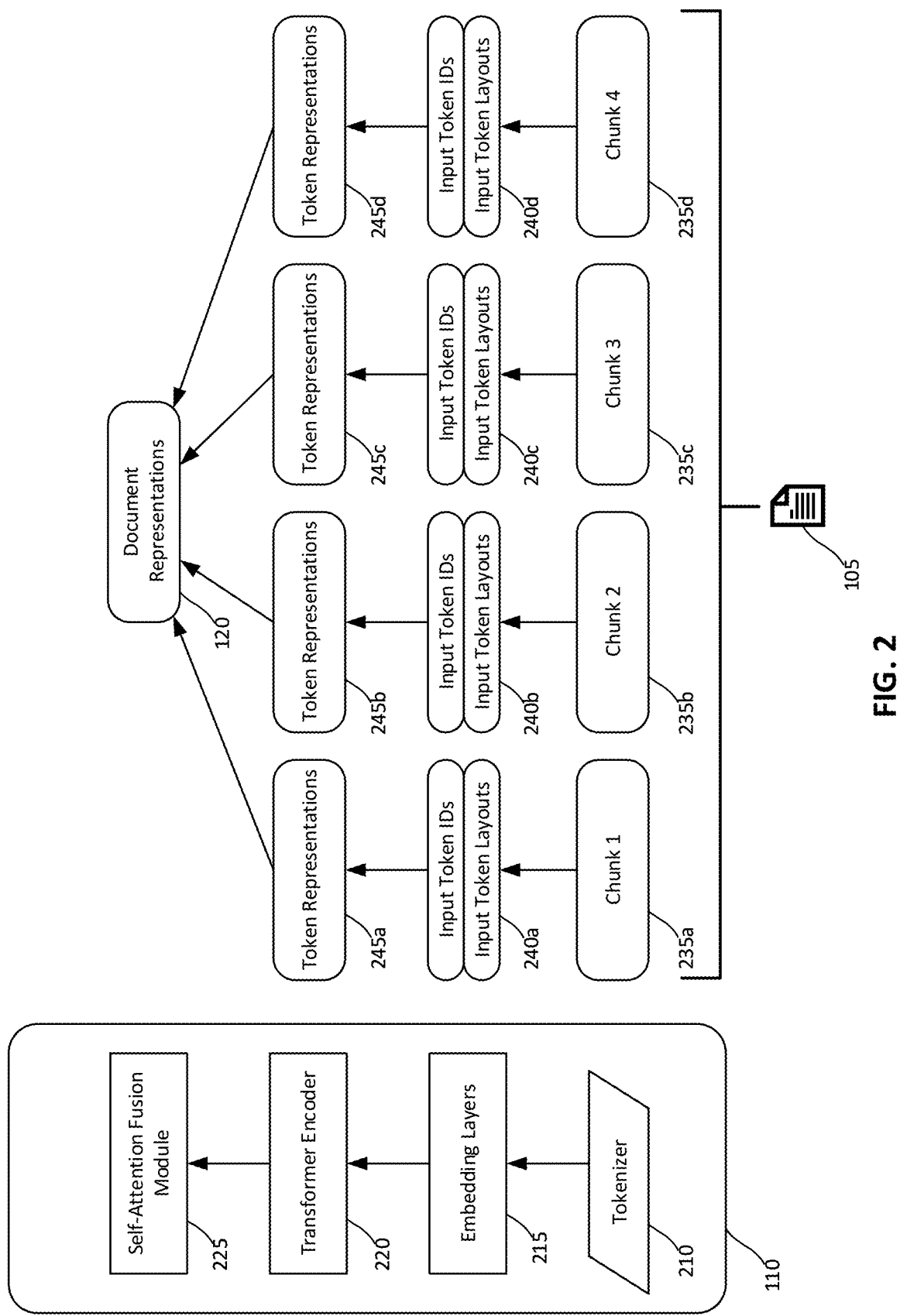
FIG. 2 is a diagram showing an example implementation of the document language model shown in FIG. 1 processing a document.
Figure 3:
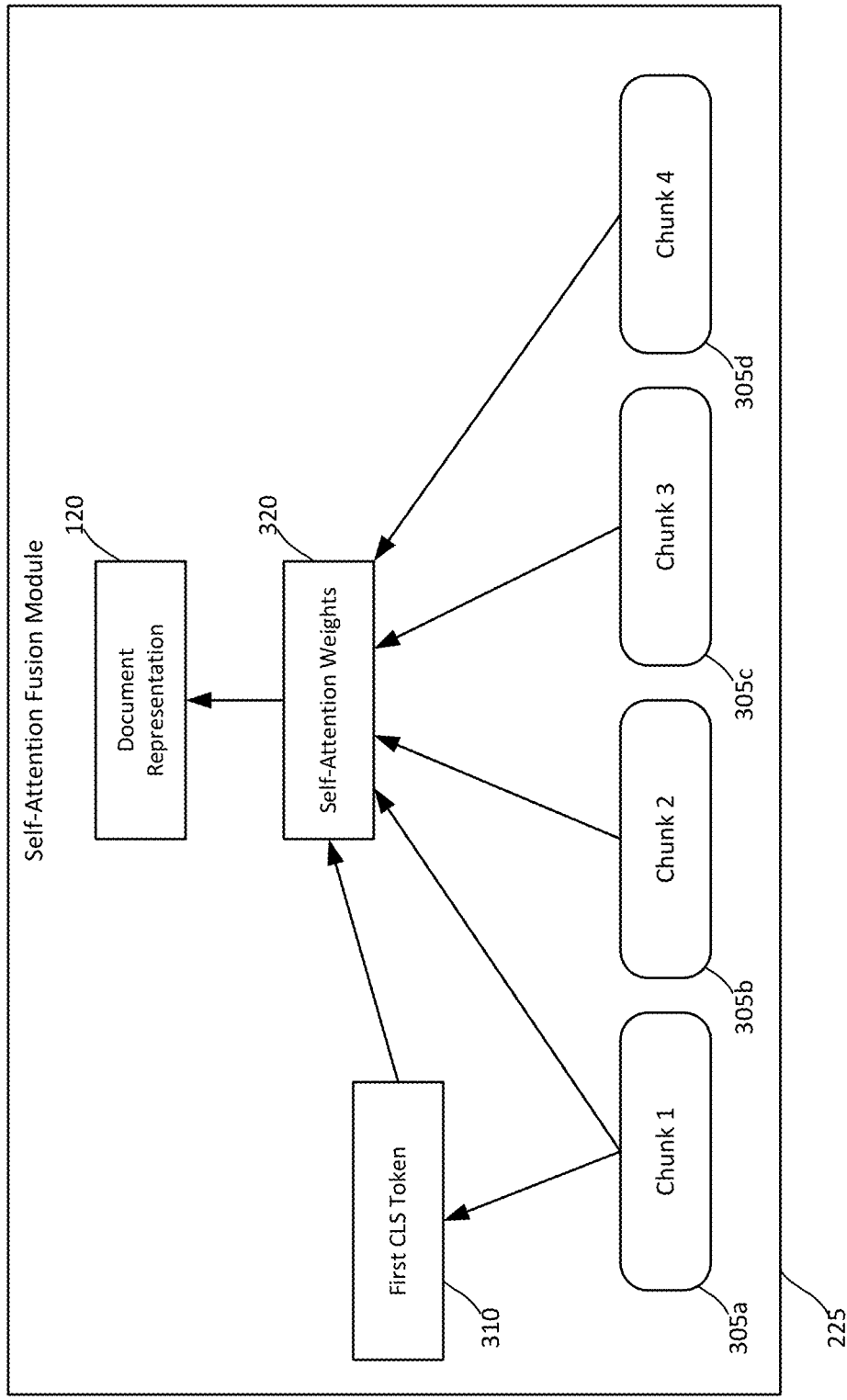
FIG. 3 is an example implementation of the self-attention fusion module of the document language model of the document language model.

FIG. 2 is a diagram showing an example implementation of the document language model, DocLM 110, shown in FIG. 1 processing a document 105. The DocLM 110 includes a tokenizer 210, embedding layers 215, transformer encoder layer 220, and self-attention fusion module 225.

The tokenizer 210 is configured analyze the document 105 and to break the document up into tokens representing the input text. The tokenizer 210 converts the textual input to a corresponding numerical value that is analyzed by the embedding layers 215. In the example shown in FIG. 2, the text of the document is first broken up into individual words, and each word is translated into a corresponding numerical token value referred to herein as a "token ID" representing that word. The tokens are also associated with token layout information. The token layout information is normalized bounding box information that captures the location of the text associated with the tokens on the document. The token layout information may include two-dimensional coordinate information that has been normalized to a relative position on the document 105. This approach allows the model to gain an understanding of the layout of the document as well as the textual content of the document. The tokens are grouped into "chunks" to facilitate processing. Each chunk includes a sequential set of text tokens and the normalized bounding boxes associated with those tokens. In the example shown in FIG. 2, the document has been grouped into four chunks 235*a*, 235*b*, 235*c*, and 235*d*, but other documents may be grouped into a different number of chunks based upon the layout and textual content of the document.

The embedding layers 215 are configured to transform the tokens of the chunks 235*a*, 235*b*, 235*c*, and 235*d* into their respective embeddings 240*a*, 240*b*, 240*c*, and 240*d*. The embeddings 240*a*, 240*b*, 240*c*, and 240*d* include a respective vector that represents the token ID of that token. The embedding also includes a representation of the token layout associated with the token. The embeddings are a numerical vector that represents the input tokens and layout information in some implementations. The embeddings include separate vectors of the same size for both the input tokens and the layout information in other implementations.

The transformer encoder layer 220 is configured to analyze the embeddings 240*a*, 240*b*, 240*c*, and 240*d* and to generate token representations 245*a*, 245*b*, 245*c*, and 245*d*. The token representations are each associated with a respective chunk of the document 105. The token representations 245*a*, 245*b*, 245*c*, and 245*d* are provided as an input to the self-attention fusion module 225. The self-attention fusion model is configured to generate a document representation 120 from the token representations 245*a*, 245*b*, 245*c*, and 245*d*.

FIG. 3 is an example implementation of the self-attention fusion module 225 of the document language model of the DocLM 110. The self-attention fusion module 225 is configured to obtain the document representation 120 by fusing the logits from each of the chunks 305*a*, 305*b*, 305*c*, and 305*d* to provide a singleton representation of the document 105. A technical benefit of this approach is that the self-attention fusion module 225 enables the DocLM 110 to support more complex document classification scenarios in which the document includes multiple pages.

The first CLS token 310 is a classifier token associated with the first chunk 305*a* of the document. The first CLS token 310 is selected as query token to compute attention weights of other context tokens in chunks 305*a*, 305*b*, 305*c* and 305*d*. The document representation 120 is combined with a weighted sum over the context token representation by self-attention weights 320. The coefficient of self-attention fusion module is initialized uniformly and trained together with other model components.

Figure 4:
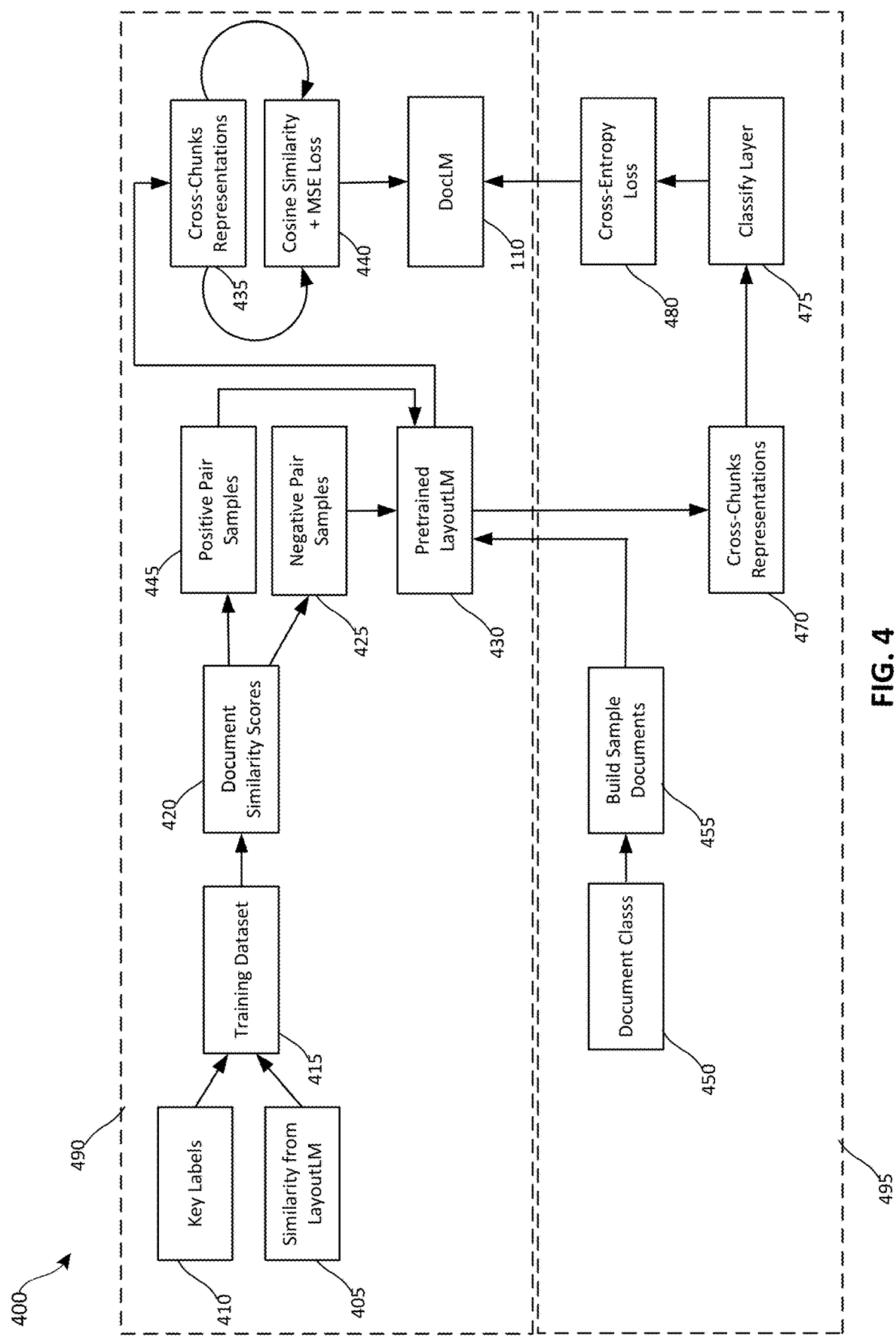
FIG. 4 is another example implementation pre-training and fine-tuning pipeline for training the document classification model shown in FIG. 1.

Although a generic DocLM could be used, pretraining the model 110 will yield better results. FIG. 4 is another example implementation pre-training and fine-tuning pipeline 400 for training the DocLM 110 shown in FIG. 1. The pre-training and fine-tuning pipeline 400 includes a pre-training phase 490 for pretraining the DocLM 110, and a fine-tuning phase 495 that is configured to fine-tune the DocLM for additional classes of documents not included in the training data used during the pre-training phase 490. The additional documents classes on which the models are trained during the fine-tuning phase 495 may be customer-specific document classes, and because the models have been pretrained, the customer only needs to provide a few examples documents in order to train the models to be able to support these additional document types.

The pre-training phase 490 uses self-supervised training to obtain document representation 120 output by the DocLM 110. During pretraining, the parameters of the embedding and transformer layers 215 and 220 and the self-attention fusion module 225 are optimized.

The pre-training phase 490 utilizes a heuristic method, described below, for generating document distance from document pairs as a training target. The document pairs are obtained from a pre-labeled key-value pair dataset 415 that includes samples of multiple classes of document that may be encountered by the model. The heuristic method uses the number of overlapping keys to determine a similarity score for documents. The training dataset 415 is a dataset that training samples that have been labeled with key labels 410 using a key value extraction technique.

A key, as used herein, refers to an element of the document which may be associated with a corresponding value. Each key may be used as a label to identify the location of a value of a particular value within the document. In a non-limiting example, the document being processed is an invoice that includes a customer name field that is labeled "Customer Name" and an invoice date field labeled "Invoice Date." When the invoice form is analyzed, "Customer Name" and "Invoice Date" are identified and extracted as keys from that document along with any other keys that are identified in the document. Other documents are associated with other keys. The heuristic method described herein utilizes these keys to determine how similar to two documents are to one another. Documents of the same or similar type will generally have similar key, while dissimilar documents will have different sets of keys. The keys may be useful in determining the similarity of documents, because the key values tend to be relatively static for different instances of a type of document.

Various types of key value extraction techniques may be used to extract the keys from the documents. Some implementations may utilize a rules-based approach that analyzes the textual content of the document to identify key-value pairs and to extract the keys. Other implementations may utilize a machine learning model configured to identify the key-value-pairs from the document and to extract the keys. In some implementations, the key value extraction technique may be implemented according to the techniques described in U.S. Pat. No. 11,055,560.

For each document d of the training dataset 415, K(d) is the labeled key collection for the document. The document similarity scores 420 are derived by comparing pairs of documents of the training dataset 415 for which the key collections have been determined. In some implementations, the comparison may include determining how many keys are the included in both documents of a pair of documents d1 and d2 (also referred to the as the intersection of the two sets of keys). In some implementations, the comparison may also include determining how many keys are included in one or both documents of the pair of documents d1 and d2 but not in the other document (also referred to as the union of the sets of keys of the documents). In some implementations, the comparison may also determine the cosine similarity of the documents d1 and d2. The cosine similarity is a commonly used metric for determining the similarity of two documents irrespective of the size of the documents being compared. The standard deviation of the cosine similarity may be combined with the other factors described above to generate the similarity score for the documents d1 and d2. The similarity score may also be normalized so the score falls within the range of 0 to 1, inclusive. In some implementations, the intersection value is divided by the union value which is multiplied the results of the sigmoid function $(1/1+e^{(-x)})$, where x is equal to number of keys included in the union of the sets of keys minus 2.

The document similarity score for a pair of documents d1 and d2 may be calculated using the following equation:

$$\text{Score}(d1,d2)=\text{normalized}(len(\cap)/len(\cup)\text{sigmoid}(len(\cup)-2)+\sigma C(d1,d2))$$

where ∩(d1, d2) is intersection keys by text matching, ∪(d1, d2) is union key set between document pair d1 and d2. C(d1, d2) is the semantic cosine similarity score 405 calculated between the CLS token from each document calculated using a standard LayoutLM model. In some embodiments, only the first chunk of each document is used to compute that cosine similarity. In other embodiments, the CLS tokens from each chunk can be combined averaged, or concatenated.

The document pair scores are determined for each of the pairs of documents in the training dataset 415 and the scores for all the documents of the training dataset 415 are included in the document similarity scores 420. Additional training data is generated for the classifier models used herein based on the document similarity scores 420. The additional training data includes positive pair samples 445 and negative pair samples 425. The positive pair samples 445 are training data that includes examples in which two documents are associated with the same class, and the negative pair samples 425 are training data that includes examples in which two documents are not within the same class. The positive pair samples 445 and the negative pair samples 425 are used to train an instance of LayoutLM to generate the pretrained LayoutLM 430.

Once the pretrained LayoutLM 430 has been generated, the performance of the model is assessed. Cross-chunk representations 435 are selected and compared in using cosine similarity and mean squared error (MSE) loss 440 to analyze the performance of the pre-trained LayoutLM 430. Different chunks of the same document should result in the same or similar token representations being generated for those chunks by the pretrained LayoutLM 430 since these chunks are part of the same document. Thus, each chunk of the document 105 processed by the pretrained LayoutLM 430 should result in similar token representations. In some implementations, the similarity of these representations is tested by determining the cosine similarity and the MSE loss associated with these representations. Other techniques for testing the similarity of these representations may be utilized in other implementations.

The cosine similarity may be used to determine the cross-chunk representations 435 are similar. The cosine similarity is a method for quantifying the similarity between two or more vectors. In this implementation, the cosine similarity is used to compare the token representations determined the chunks of a document to determine whether they are similar. The values should be similar across the document. The cosine similarity is bound to a range from 0 to 1 (inclusive). The cosine similarity increases as the similarity of the vector increases and decreases as the vectors are more dissimilar. The cosine similarity value may be compared to a threshold value to determine whether the cosine similarity is acceptable when training the models.

The MSE loss function is commonly used to measure the amount of error in the predictions of models. The MSE loss function assesses the average squared difference between the observed and predicted values. The value of the MSE is zero where the model has no error and increases as the amount of error increases. The value of the MSE in this implementation indicates how similar or dissimilar the cross-chunk representations 435 are from one another. The specific MSE value that is acceptable for a particular model may vary depending upon the particular implementation. The MSE value may be compared to a threshold value to determine whether the MSE is acceptable.

If the cosine similarity and mean squared error (MSE) loss 440 indicate that the pretrained model is performed within designated parameters, the instance of the model may be deployed as the DocLM 110 described herein. The DocLM 110 and the classifier model 130 may be further trained using samples of additional document classes that were not included training dataset. As discussed in the preceding examples, a small number of examples may be used to train the DocLM 110 and the classifier model 130 on these additional document types. For example, as few as 1 to 5 examples may of a new document type may be used to train the models. However, if the cosine similarity and mean squared error (MSE) loss 440 indicate that the pretrained model is not performing according to designated parameters, the instance of the model may require further training to ensure that the model will be able to handle longer document types that are broken up into multiple chunks for analysis by the pretrained LayoutLM 430.

In the fine-tuning phase 495, a new document class 450 may be introduced and one or more sample documents 455 of the new document class 450 are created. The one or more sample documents 455 may be used to train the pretrained LayoutLM 430 which was trained in the pre-training phase 490. Once the pretrained LayoutLM 430 has been trained with the one or more sample documents 455, the cross-chunks representations 470, which are similar to the cross-chunk representations 435 discussed in the pre-training phase 490. The cross-chunk representations 470 may be used to assess the performance of the pretrained LayoutLM 430. The cross-chunk representations 470 are provided as an input to the classify layer 475, which is configured to determine a document classification for a document being processed. The cross-entropy loss stage 480 compares the classification output by the classify layer with an expected classification value. The cross-entropy loss stage 480 determines the entropy loss, which may be used for adjusting model weights of the DocLM 110 during training. A perfect model has a cross-entropy of zero. Thus, the goal of the cross-entropy loss stage 480 is to adjust the weights of the model to minimize the loss. The cross-entropy loss may be used to adjust the weights of the DocLM 110 whose performance is being fine-tuned to support additional classes of documents.

FIG. 5 is another implementation of the document classification pipeline 500 shown in the preceding examples that includes segmentation functionality for processing inputs that include multiple files. The document 505 may be a scanned document that includes multiple documents or the document 505 may be a file that includes multiple digital documents that have been concatenated together. The documents may be of the same class or different document classes. The document 505 is segmented into a separate page 510, and each of the pages are analyzed by the LayoutLM 520 in order to obtain page representations 530. The LayoutLM 520 is pretrained to extract textual content and layout information from the document pages 510 and output the page representations 530.

The page representations 530 are provided to a classifier module 545 and a splitter module 535. The classifier module 545 is configured to output page-class predictions 550, which include predictions of the document class associated with the individual document pages 530 and includes predictions whether the page falls into one of four categories: a beginning page of a document, an intermediate page of a document, an end page of a document, or that the page represents a single-page document. The splitter module 535 computes an estimate of the probability that each two subsequent pages are part of the same document. The page-class predictions 550 and the splitting predictions 540 are provided to Viterbi decoder 560. The Viterbi decoder 560 is configured to analyze the page-class predictions 550 and the splitting predictions 540 and to generate segmentation results 570 that represent a prediction of the sequence of pages associated with each of the documents provided as an input and the associated class for those documents. In one embodiment, the Viterbi decoder takes probabilities of splitting or not splitting between each subsequent page pair, as well as classification probabilities for each page. The Viterbi decoder then computes the split and classification with the highest probability. In yet another embodiment, the classification into document type is refined with the four subclasses for each document type: beginning page, intermediate page, end page, and single page. This split into four subclasses is often used in other tasks, and sometimes referred in the literature as BIES. In a non-limiting example to illustrate these concepts, a three-page document 105 is provided as an input to the document classification pipeline 500, and the Viterbi Decoder 560 outputs segmentation results 570 that indicate that the input file included: (1) a first document that includes pages 1 and 2 of the input file and is a document of type of Class A, and (2) a second document that includes page 3 of the input file and is a document of type Class B. The specific number of documents included in an input file, such as document 505, and the types of documents included in the input file may vary.

Figure 6:
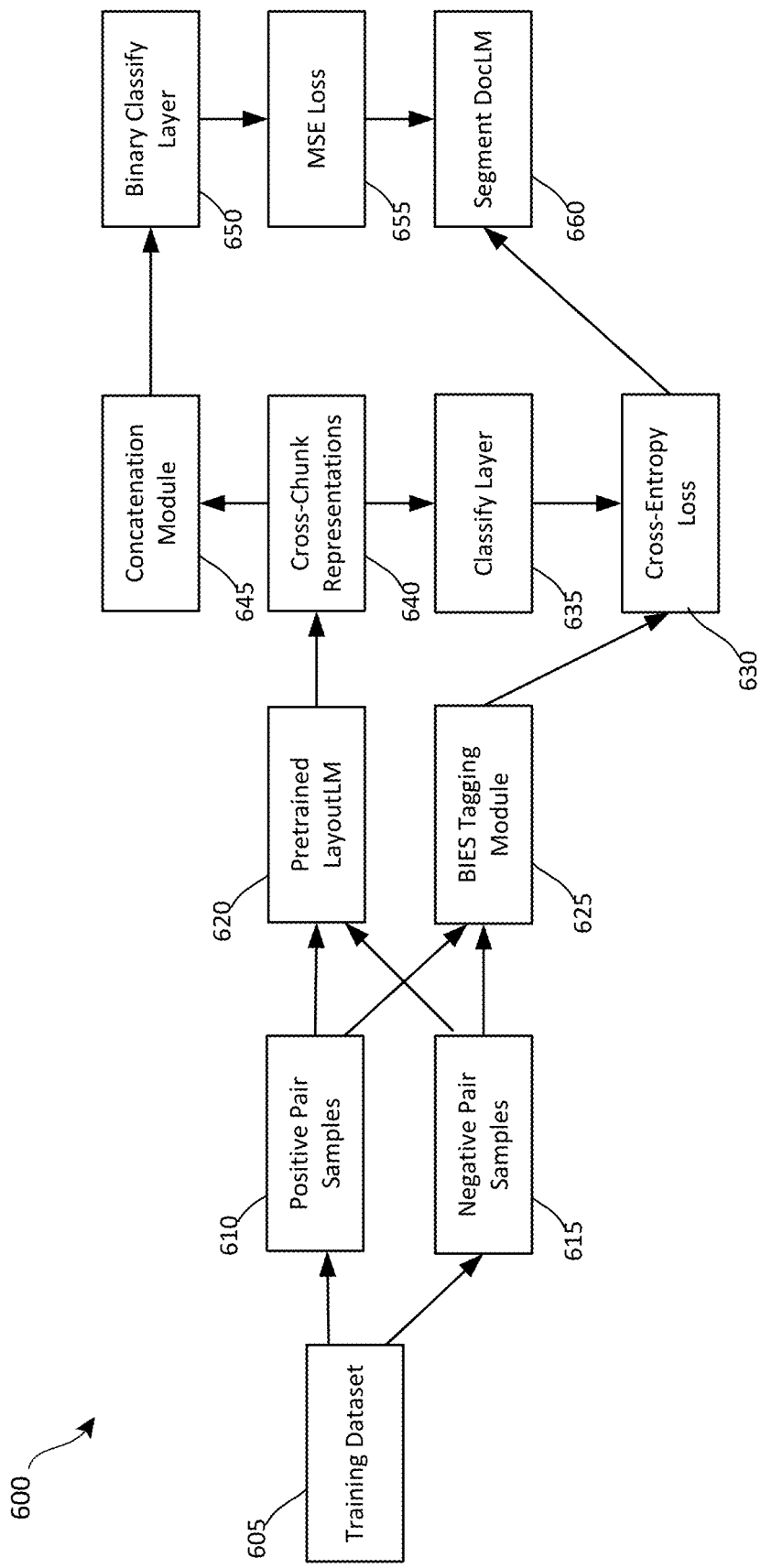
FIG. 6 is an example of the pre-training pipeline for training the segmentation models used by the document classification pipeline shown in FIG. 5.

FIG. 6 is an example pre-training pipeline 600 for training the segmentation models shown in FIG. 5. The pre-training pipeline 600 uses a training dataset 605. The training dataset 605 may be similar to the training dataset 415 shown in FIG. 4. The training dataset 605 includes samples of the various classes of documents of types that may be encountered by the models. While the training dataset 415 may be limited to single page document examples, the training dataset 605 includes a mix of single page and multiple page document examples so that the segmentation functionality of the models of the document classification pipeline 500 can be trained to recognize and properly segment both multipage and single-page documents.

Training data that includes positive pair samples 610 and negative pair samples 615 are then generated based on the document similarity scores. The positive pair samples 610 may be generated in a similar manner as the positive pair samples 445 shown in FIG. 4, and the negative pair samples 615 may be generated in a similar manner as the negative pair samples 425 shown in FIG. 4. The positive pair samples 610 are training data that includes examples in which two documents are associated with the same class, and the negative pair samples 615 are training data that includes examples in which two documents are not within the same class. The positive pair samples 610 and the negative pair samples 615 are used to train an instance of LayoutLM to generate the pretrained LayoutLM 620.

The positive pair samples 610 and negative pair samples 615 are also provided as an input to the BIES tagging module 625. The BIES tagging module 625 is configured to add tags designating whether a sample document included in the training data is a multiple page document or a single page document. For single-page documents, the document may be tagged with a "S" indicating that the document is a single-page document. For multiple-page documents, the first page of the document may be tagged with a "B" for beginning page, an "I" for an intermediate page, or an "E" for an ending page of the document. These tags help the models learn to recognize the beginning, middle, and end of multipage documents, and to identify single-page documents. The tagged training data is output to the cross-entropy loss stage 630 along with the output from the classify layer 635.

The cross-chunk representations 640 may be used to assess the performance of the pretrained LayoutLM 620. The cross-chunk representations 640 are provided as an input to the classify layer 635, which is configured to determine whether each page of the input is a single-page document, or a first page, intermediate page, or end page of a multi-page document. The cross-entropy loss stage 630 compares the labeled data obtained from the BIES tagging module with the classifications generated by the classify layer 635. The cross-entropy loss stage 630 determines the entropy loss, which may be used as a loss function for training a classifier model. The cross-entropy loss is used when adjusting model weights during training. A perfect model has a cross-entropy of zero. Thus, the goal of the cross-entropy loss stage 630 is to adjust the weights of the model to minimize the loss. The cross-entropy loss may be used to adjust the weights of the segment DocLM 660 which may be used to implement the splitter module 535 of the document classification pipeline 500.

The cross-chunk representations 640 are also concatenated by the concatenation module 645 and the concatenated output is provided to the binary classify layer 650. The binary classify layer 650 may be configured to determine whether each pair of subsequent pages are part of the same document or not. The MSE loss 655 may be determined based on the output of the binary classifier layer 650 and used to adjust the weights of the segment DocLM 660.

Figure 7:
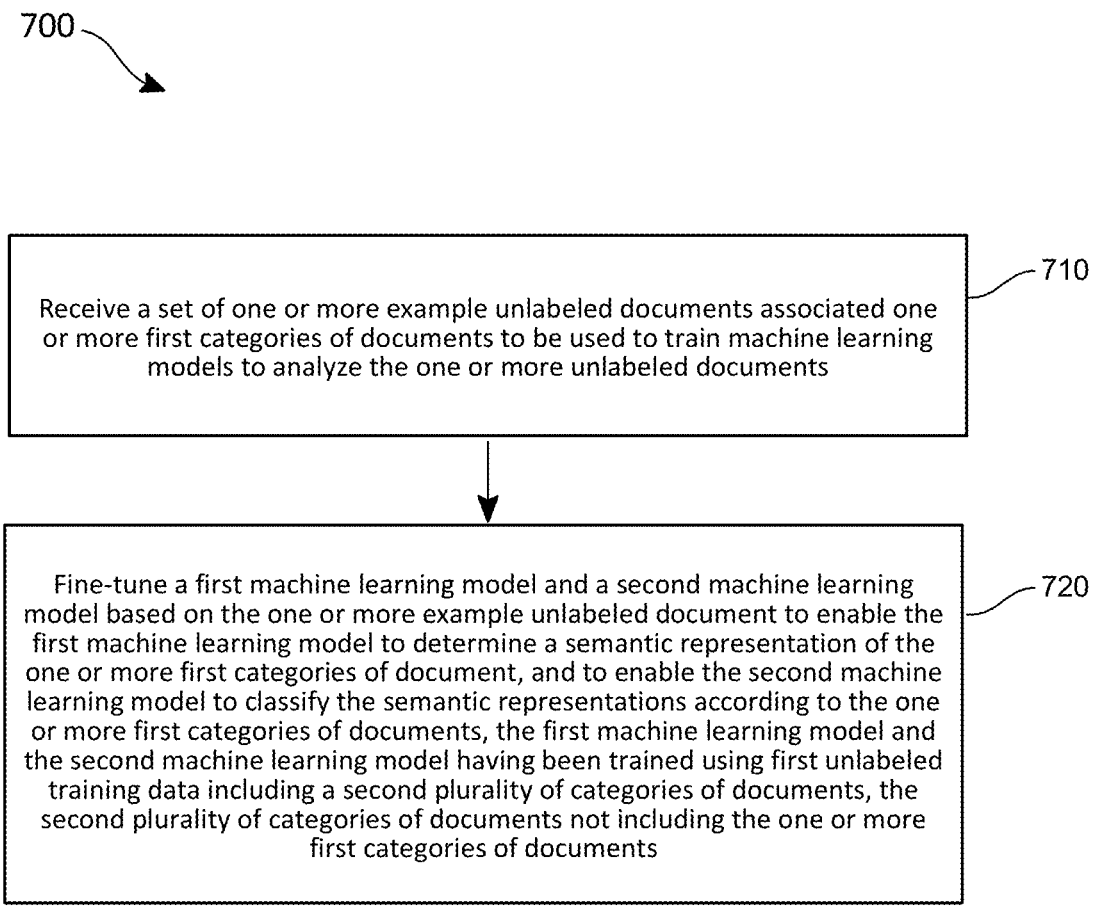
FIG. 7 is a flow diagram of a process for classifying a document according to the techniques described herein.

FIG. 7 is a flow diagram of a process 700 for classifying a document according to the techniques described herein. The process 700 includes an operation 710 of receiving a set of one or more unlabeled documents associated one or more first categories of documents to be used to train machine learning models to analyze the one or more unlabeled documents. The first categories of documents may be examples of user-specific documents that the user would like to analyze using the DocLM 110 or the LayoutLM 520, but the models have not yet been trained with examples of these categories of documents.

The process 700 includes an operation 720 of fine-tuning the training of a first machine learning model and a second machine learning model based on the one or more example unlabeled document to enable the first machine learning model to determine a semantic representation of the one or more first categories of document, and to enable the second machine learning model to classify the semantic representations according to the one or more first categories of documents. The first machine learning model and the second machine learning model having been pretrained using first unlabeled training data including a second plurality of categories of documents, the second plurality of categories of documents not including the one or more first categories of documents. The first machine learning model represents the DocLM 110 or the LayoutLM 520 described in the preceding examples. As discussed in the preceding examples, the models may be pretrained using a set of training data that includes many examples of many different types of documents. This enables the user to fine-tune the model to support additional categories of documents with minimal training data. The models are configured to analyze, and categories documents received as an input to the document classification pipeline 100 or the document classification pipeline 500.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
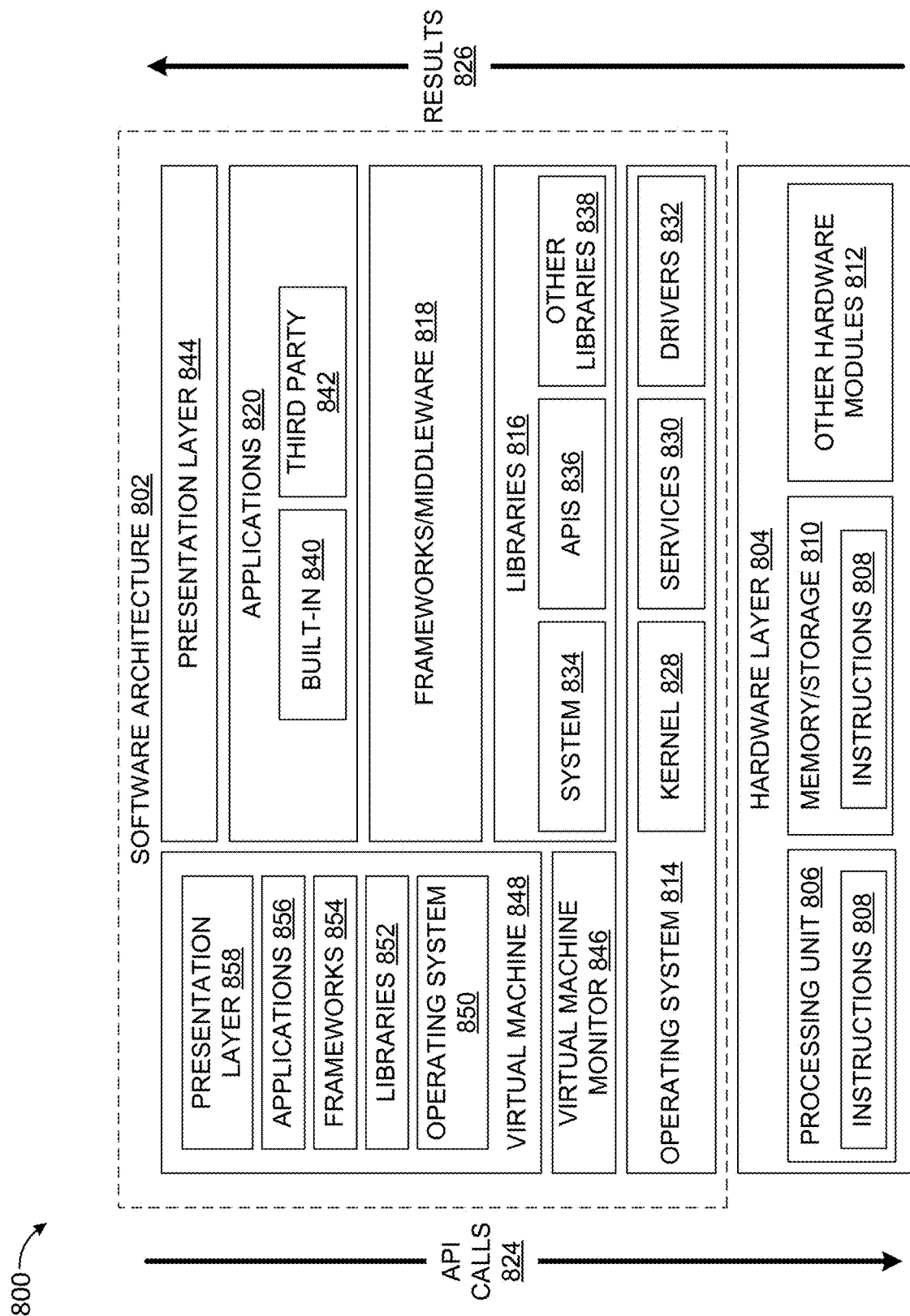
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
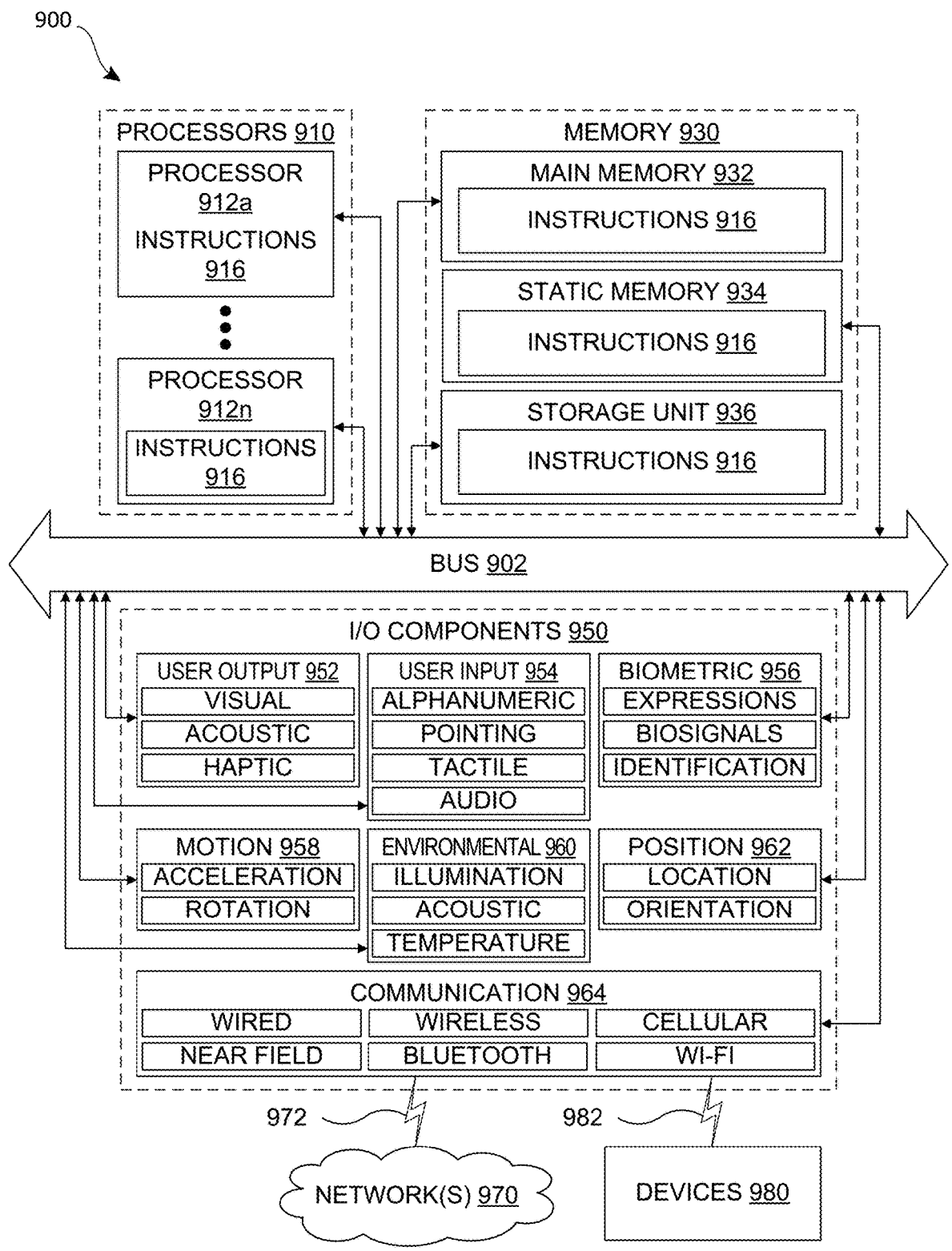
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS)

receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor to perform operations comprising:
      receiving a set of one or more unlabeled documents associated with one or more first categories of documents to be used to train machine learning models to analyze the set of one or more unlabeled documents; and
      fine-tuning a first machine learning model and a second machine learning model based on the set of one or more unlabeled documents to enable the first machine learning model to determine a semantic representation of the one or more first categories of document, and to enable the second machine learning model to classify semantic representations according to the one or more first categories of documents, the first machine learning model and the second machine learning model having been trained using first unlabeled training data including a second plurality of categories of documents, the second plurality of categories of documents not including the one or more first categories of documents.

2. The data processing system of claim 1, wherein the machine-readable medium includes instructions configured to cause the processor to perform operations of:
pretraining, using an unsupervised training method using first unlabeled training data, an instance of the first machine learning model for determining a document representation of a document received as an input, the document representation comprising the semantic representation of the document, and an instance of the second machine learning model for determining a category of the document based on the semantic representation output by the first machine learning model, the first unlabeled training data including the second plurality of categories of documents.

3. The data processing system of claim 2, wherein the second machine learning model is a distance-based classifier trained to predict a nearest class of document based on a distance between the semantic representation of the document and a predicted document class for the document, and wherein the machine-readable medium includes instructions configured to cause the processor to perform operations of:
analyzing documents of the first unlabeled training data to determine key values for each of the second plurality of categories of documents; and
pretraining the second machine learning model using a heuristic process in which pairs of documents from the first unlabeled training data are compared by comparing the key values associated with a first document of a pair of documents of the pairs of documents with key values associated with a second document of the pair to determine a distance between the first document and the second document.

4. The data processing system of claim 1, wherein the first machine learning model is configured to perform operations of:
receiving a first document as an input;
tokenizing the first document into a plurality of tokens;
segmenting the plurality of tokens into a plurality of chunks comprising sequential subset of the plurality of tokens;
analyzing each of the plurality of chunks using a transformer encoder layer of the first machine learning model to generate a token representation for each of the plurality of chunks; and
combining the token representation for each of the plurality of chunks to generate a document representation for the document comprising a semantic representation of the first document.

5. The data processing system of claim 4, wherein combining the token representation for each of the plurality of chunks to generate the document representation further comprises:
combining the token representation for each of the plurality of chunks to generate the document representation for the document using a self-attention fusion module of the first machine learning model.

6. The data processing system of claim 1, wherein the machine-readable medium includes instructions configured to cause the processor to perform operations of:
receiving an input file to the first machine learning model that includes a plurality of documents;
segmenting the input file into a plurality of representations of document pages;
providing the plurality of representations of document pages to a classifier module configured to output classification predictions including a predicted category for each document page;
providing the plurality of representations of document pages to a splitter module configured to output splitting predictions including a prediction whether each document page is a single-page document or a page of a multipage document; and
combining the classification predictions and the splitting predictions to obtain segmentation results that identify each document predicted to be included in the input file, a number of pages associated with each document, and a predicted category for the document.

7. The data processing system of claim 6, wherein combining the classification predictions and the splitting predictions further comprises:
analyzing the classification predictions and the splitting predictions using a Viterbi decoder.

8. The data processing system of claim 6, wherein segmenting the input file into a plurality of document pages further comprises:
providing the input file to an instance of a pretrained LayoutLM; and
obtaining the plurality of representations of document pages as an output of the pretrained LayoutLM.

9. A method implemented in a data processing system for classifying a document, the method comprising:
receiving a set of one or more unlabeled documents associated with one or more first categories of documents to be used to train machine learning models to analyze the set of one or more unlabeled documents; and
fine-tuning a first machine learning model and a second machine learning model based on the set of one or more unlabeled documents to enable the first machine learning model to determine a semantic representation of the one or more first categories of document, and to enable the second machine learning model to classify semantic representations according to the one or more first categories of documents, the first machine learning model and the second machine learning model having been trained using first unlabeled training data including a second plurality of categories of documents, the second plurality of categories of documents not including the one or more first categories of documents.

10. The method of claim 9, further comprising:
pretraining, using an unsupervised training method using first unlabeled training data, an instance of the first machine learning model for determining a document representation of a document received as an input, the document representation comprising the semantic representation of the document, and an instance of the second machine learning model for determining a category of the document based on the semantic representation output by the first machine learning model, the first unlabeled training data including the second plurality of categories of documents.

11. The method of claim 10, wherein the second machine learning model is a distance-based classifier trained to predict a nearest class of document based on a distance between the semantic representation of the document and a predicted document class for the document, and the method further comprising:

analyzing documents of the first unlabeled training data to determine key values for each of the second plurality of categories of documents; and pretraining the second machine learning model using a heuristic process in which pairs of documents from the first unlabeled training data are compared by comparing the key values associated with a first document of a pair of documents of the pairs of documents with key values associated with a second document of the pair to determine a distance between the first document and the second document.

12. The method of claim 9, further comprising performing, with the first machine learning model, operations of;

receiving a first document as an input;

tokenizing the first document into a plurality of tokens;

segmenting the plurality of tokens into a plurality of chunks comprising sequential subset of the plurality of tokens;

analyzing each of the plurality of chunks using a transformer encoder layer of the first machine learning model to generate a token representation for each of the plurality of chunks; and combining the token representation for each of the plurality of chunks to generate a document representation for the document comprising a semantic representation of the first document.

13. The method of claim 12, wherein combining the token representation for each of the plurality of chunks to generate the document representation further comprises:

combining the token representation for each of the plurality of chunks to generate the document representation for the document using a self-attention fusion module of the first machine learning model.

14. The method of claim 9, further comprising:

receiving an input file to the first machine learning model that includes a plurality of documents;

segmenting the input file into a plurality of representations of document pages;

providing the plurality of representations of document pages to a classifier module configured to output classification predictions including a predicted category for each document page;

providing the plurality of representations of document pages to a splitter module configured to output splitting predictions including a prediction whether each document page is a single-page document or a page of a multipage document; and combining the classification predictions and the splitting predictions to obtain segmentation results that identify each document predicted to be included in the input file, a number of pages associated with each document, and a predicted category for the document.

15. The method of claim 14, wherein combining the classification predictions and the splitting predictions further comprises:

analyzing the classification predictions and the splitting predictions using a Viterbi decoder.

16. The method of claim 14, wherein segmenting the input file into a plurality of document pages further comprises:

providing the input file to an instance of a pretrained LayoutLM; and obtaining the plurality of representations of document pages as an output of the pretrained LayoutLM.

17. A machine-readable medium on which are stored instructions that, when executed, cause a processor of a programmable device to perform operations of:

receiving a set of one or more unlabeled documents associated with one or more first categories of documents to be used to train machine learning models to analyze the set of one or more unlabeled documents; and fine-tuning a first machine learning model and a second machine learning model based on the set of one or more unlabeled documents to enable the first machine learning model to determine a semantic representation of the one or more first categories of document, and to enable the second machine learning model to classify semantic representations according to the one or more first categories of documents, the first machine learning model and the second machine learning model having been trained using first unlabeled training data including a second plurality of categories of documents, the second plurality of categories of documents not including the one or more first categories of documents.

18. The machine-readable medium of claim 17, further comprising instructions configured to cause the processor to perform operations of:

pretraining, using an unsupervised training method using first unlabeled training data, an instance of the first machine learning model for determining a document representation of a document received as an input, the document representation comprising the semantic representation of the document, and an instance of the second machine learning model for determining a category of the document based on the semantic representation output by the first machine learning model, the first unlabeled training data including the second plurality of categories of documents.

19. The machine-readable medium of claim 18, wherein the first machine learning model is configured to perform operations of:

receiving a first document as an input;

tokenizing the first document into a plurality of tokens;

segmenting the plurality of tokens into a plurality of chunks comprising sequential subset of the plurality of tokens;

analyzing each of the plurality of chunks using a transformer encoder layer of the first machine learning model to generate a token representation for each of the plurality of chunks; and combining the token representation for each of the plurality of chunks to generate the document representation for the document.

* * * * *